No. 766,580. PATENTED AUG. 2, 1904.
A. S. BAKER.
DETACHABLE REEL SUPPORT.
APPLICATION FILED APR. 22, 1904.
NO MODEL.
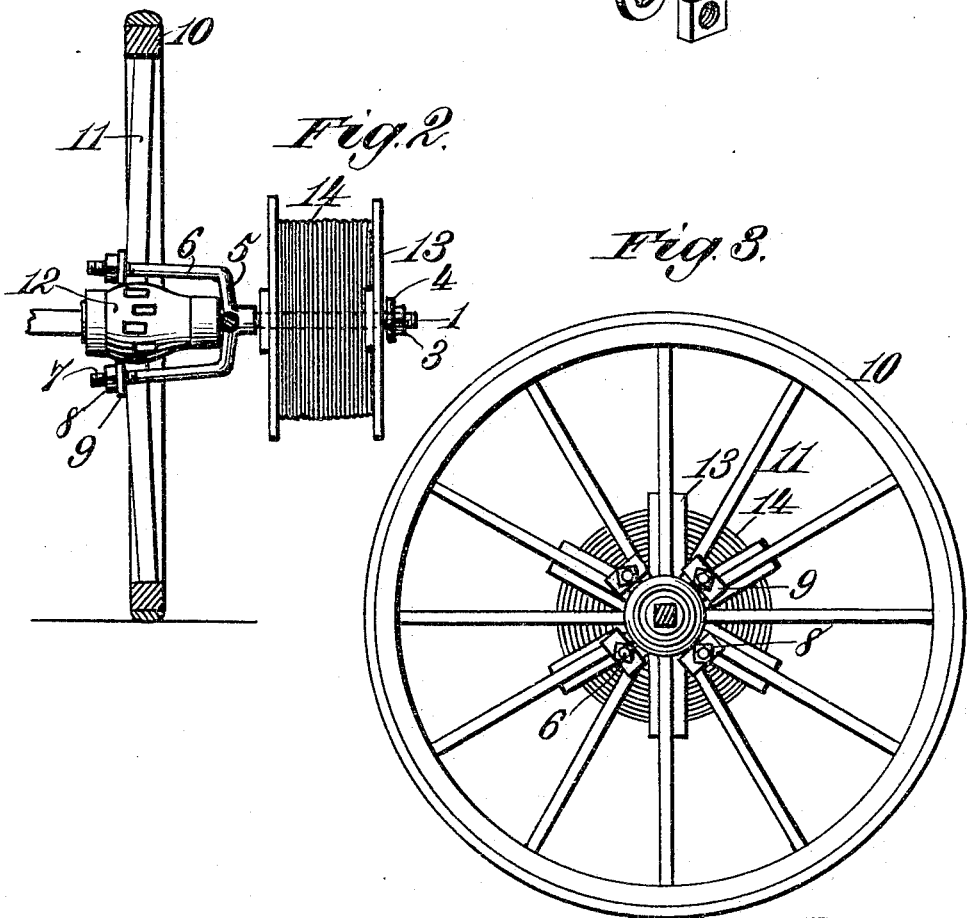

No. 766,580. Patented August 2, 1904.

UNITED STATES PATENT OFFICE.

ALBERT S. BAKER, OF SABANNO, TEXAS.

DETACHABLE REEL-SUPPORT.

SPECIFICATION forming part of Letters Patent No. 766,580, dated August 2, 1904.

Application filed April 22, 1904. Serial No. 204,455. (No model.)

*To all whom it may concern:*

Be it known that I, ALBERT S. BAKER, a citizen of the United States, residing at Sabanno, in the county of Eastland and State of Texas, have invented new and useful Improvements in Detachable Reel-Supports, of which the following is a specification.

This invention relates to detachable reel-supports.

The invention aims to provide a new and novel form of support to be hereinafter more specifically referred to and which can be readily secured to and removed from a vehicle-wheel and when attached to the vehicle-wheel will support a reel in such a manner so that when the wheel is rotated in one direction or the other it will cause, respectively, the winding on or off the reel of fence-wires, cables, and the like.

The invention further aims to provide a detachable reel-support for use in connection with fence-wires, cables, and the like which shall be extremely simple in its construction, strong, durable, efficient in its use, and comparatively inexpensive to manufacture.

With the foregoing and other objects in view the invention consists in the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, and wherein like reference characters denote corresponding parts throughout the several views, and in which—

Figure 1 is a perspective view of the detachable reel-support. Fig. 2 is a sectional elevation showing the reel-support as attached to the wheel of a vehicle, and Fig. 3 is a side elevation of a vehicle-wheel with the support attached thereto carrying a reel with fence-wire thereon.

Referring to the drawings by reference characters, 1 denotes the reel-carrying member in the form of an elongated arm or bar and which has its outer end screw-threaded, as at 2, and upon said screw-threaded end 2 is mounted a washer 3 and clamping-nut 4. The inner end of the member 1 terminates in a plurality of suspension-arms therefor, and the said arms extend outwardly in a lateral direction, as at 5, and then in the direction of the length of the member 1, as at 6. The inner or free ends of the suspension-arms are screw-threaded, as at 7, and upon said screw-threads 7 are mounted the clamping-nuts 8 and the rectangular-shaped washers 9, the latter being of greater length than the nuts, so as to engage a pair of spokes of a wheel in a manner as hereinafter set forth.

The reference characters 10, 11, and 12 denote, respectively, the rim, spokes, and hub of a vehicle-wheel, and the reference characters 13 and 14 denote, respectively, the reel mounted upon the member 1 and the fence-wire carried by the reel. The reel-support is secured to the vehicle-wheel by inserting the suspension-arms between the spokes, so that the hub will be within the arms, and the washers 9 are then placed against a pair of the spokes, at the inner face thereof, and the nuts 8 screwed home, so as to securely clamp the suspension-arms to the spokes of the wheel. When in such position, the laterally-extending portions 5 of the arms will bind against the front of the wheel, and consequently the support will be secured rigidly in position. The reel 13 may be mounted upon the support when it is secured in position or may be mounted upon the support after it has been secured in position to the wheel. In any case after the reel is in position it is secured upon the member 1 through the medium of the nuts and washers 3 4. If it be desired to reel off and on the wire while the vehicle remains stationary, all that is necessary to do is to prop up the wheel of the vehicle to which the support is attached, and then by rotating the wheel the wire can be reeled on, or by pulling upon the wire it can be reeled off. If it be desired to reel off the wire without propping the wheel to which the support is attached, motion is imparted to the vehicle, and owing to the fact that the reel is not clamped upon the member 1 as the vehicle travels the wire will be reeled off.

Having thus fully described my invention, what I claim as new, and desire to secure by Letters Patent, is—

1. A detachable reel-support comprising an elongated reel-carrying member, and a plurality of suspension-arms integral with one end of said member and extending a portion of their length in a lateral manner and then in the direction of the length of said member.

2. A detachable reel-support comprising an elongated reel-carrying member, a plurality of suspension-arms integral with one end of said member and extending a portion of their length in a lateral manner and then in the direction of the length of said member, clamping means mounted upon the other end of said member, and a clamping means mounted upon the free end of each of said arms.

3. A reel-support comprising a reel-carrying member, a plurality of suspension-arms integral with one end of said member, and a clamping-nut and washer mounted upon each of said arms, said washers being of greater length than said nuts.

4. A detachable reel-support consisting of an elongated bar having its outer end screw-threaded, a clamping-nut mounted upon said screw-threaded end, a plurality of suspension-arms suitably connected with the inner end of said rod and extending a portion of their length in a lateral direction and the remaining portion in the direction of the length of said rod, said arms having their inner ends screw-threaded, nuts mounted upon the screw-threaded ends of said arms, and elongated washers mounted upon the screw-threaded ends of said arms.

In testimony whereof I have hereunto set my hand in presence of two subscribing witnesses.

ALBERT S. BAKER.

Witnesses:
L. A. READ,
B. F. JONES.